June 10, 1958 — M. RIGERT — 2,838,630
SWITCH CONSTRUCTION
Filed July 16, 1956 — 2 Sheets-Sheet 1

INVENTOR.
MAX RIGERT
BY Ralph G. Hohenfeldt
ATTORNEY

June 10, 1958 M. RIGERT 2,838,630
SWITCH CONSTRUCTION
Filed July 16, 1956 2 Sheets-Sheet 2

INVENTOR.
MAX RIGERT
BY Ralph G. Hohenfeldt

ATTORNEY

United States Patent Office 2,838,630
Patented June 10, 1958

2,838,630

SWITCH CONSTRUCTION

Max Rigert, West Allis, Wis., assignor to McGraw-Edison Company, a corporation of Delaware Application July 16, 1956, Serial No. 597,967

3 Claims. (Cl. 200—98)

This invention relates to a switch construction.

An object of the invention is to provide a switch which opens and closes rapidly and to further provide an electromagnetic switch actuator which operates the switch immediately upon receipt of a control signal.

A further object is to provide a switch construction which, though primarily intended for remote control, may nevertheless be operated manually in the event the remote control circuit becomes inoperative, and which, when operated manually, is free of any restraint by the remote or the automatic operating means.

A switch of the type forming the subject of the instant invention has a variety of uses but is primarily intended for connecting and disconnecting groups of power factor correcting capacitors to a power system. It is customary in such cases to divide the capacitor bank in increments which are switched on and off the system in accordance with the latter's demand for power factor correction. In conventional schemes, the various subdivided capacitor groups are provided with individual switches and it is immediately apparent that a great number of such switches may be needed in a large capacitor installation. Accordingly, the cost, compactness and reliability of the capacitor switch are factors which bear considerable weight in determining whether the whole installation can be justified. It is therefore a further object of this invention to provide a switch which is inexpensive and simple in construction, the latter feature tending to decrease maintenance and enhance reliability.

Other objects will appear periodically throughout the course of the specification.

Embodiments of the invention are shown in the following drawings in which.

Figure 1:
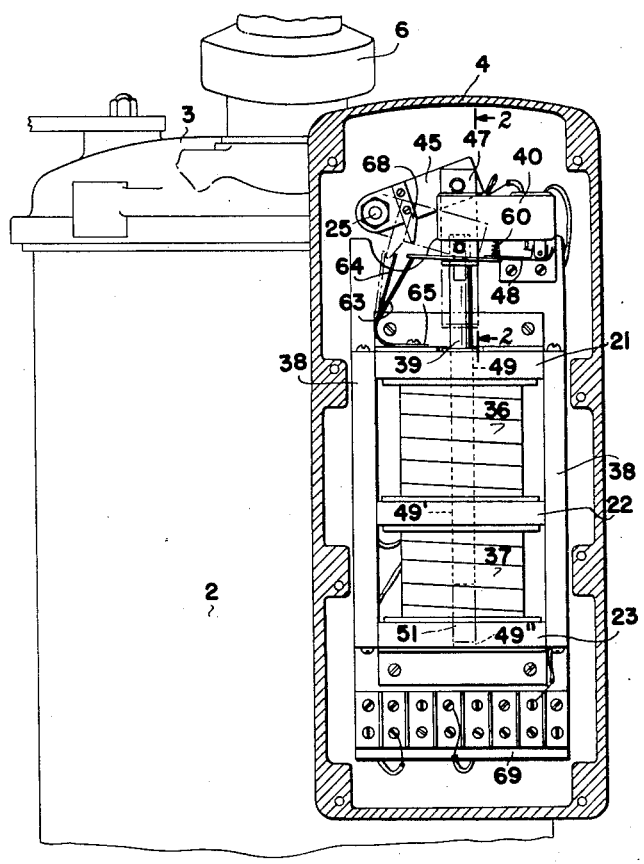
Fig. 1 is an assembly of a switch and actuator, with parts broken away.
Figure 4:
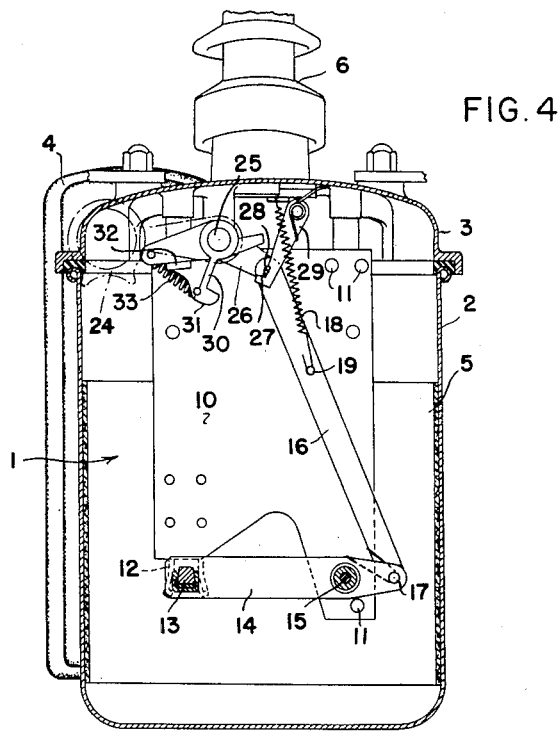
Fig. 4 is a vertical sectional view taken through the center of the switch means, showing the switch in closed position.

Referring to Fig. 1 in conjunction with Fig. 4, it will be seen that the assembly includes a switch means, generally designated 1, housed in a metal tank 2 enclosed by a cast metal cover 3 gasketed and bolted to the metal tank by any conventional means. The mechanism of the switch 1 is entirely supported from cover 3 and it is removable therewith along with the switch actuator housing 4 also integrally supported on cover 3 but free of the tank.

A motor operated switch, comparable but not identical with that illustrated in connection with the instant invention, may be seen in great detail by referring to U. S. Pat. No. 2,671,141 issued to W. J. Weinfurt and assigned to the instant assignee.

It is preferable to increase the dielectric strength between the energized parts of switch 1 and metal tank 2 by inserting within the tank an interior fibre liner 5 and filling the tank with dielectric fluid to a level very near cover 3.

In the drawings only one porcelain bushing 6 is shown but it will be understood that there is a companion bushing for bringing electrical wiring in and out of tank 2 through cover 3 on which the bushings 6 are supported.

Figure 5:
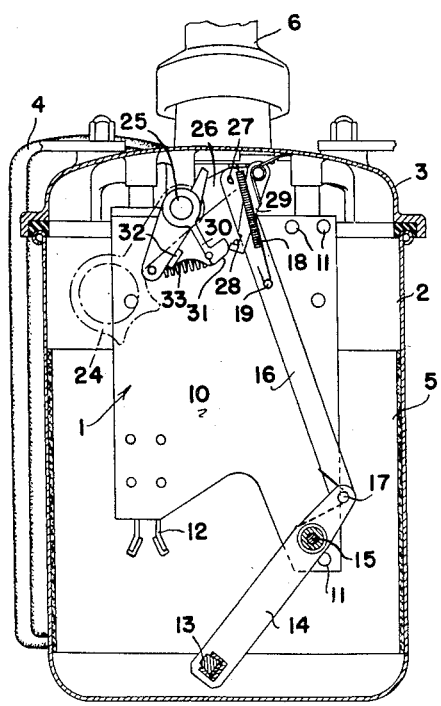
Fig. 5 is similar to Fig. 4 but showing the switch in open position.

The switch mechanism includes a pair of transverse insulating plates 10, one of which is shown in the section view, suspended from cover 3 and secured by anchoring screws 11. Insulating plate 10 and its counterpart are spaced in planes parallel to the drawing, and each support stationary contacts 12 which are connected serially between incoming and outgoing bushings 6 by means of a conductive bridging bar 13 carried at the free end of an insulating contact lever 14 which is in turn pivotally journalled on a cross pin 15 supported between companion insulating plates 10. Contact lever 14 is rotated from switch closed position in Fig. 4 to switch open position in Fig. 5 by means of a long insulating link 16 extending from a pivotal connection 17 upwardly through tank 2 into proximity with the cover 3. A switch opening coil spring 18 is interposed between cover 3 and a point of attachment 19 intermediate the ends of insulating link 16. It will be understood that there are actually two such tension springs 18 in alignment with each other and that only one of them is shown in the sectional view of Fig. 4 under consideration. In the last named figure it will be noted that spring 18 is extended when bridging bar 13 is completing the circuit through the switch 1 and that the spring 18 is contracted when the switch is open as in the subsequent figure.

It has been indicated that the switch means 1 may be operated either electromagnetically, by mechanism in housing 4 of Fig. 1, or by manual means which will now be described.

The manual means comprise an eyeleted manual operating handle 24 rigidly affixed to a rock shaft 25 which is journalled in and extends through opposite sides of cover 3. The end of rock shaft 25 opposite from that which carries handle 24 extends into the actuator housing 4, see Fig. 1, and is operated by the actuator independently of or in conjunction with the handle 24 in a manner to be described hereinafter.

It will be observed that insulating link 16 is pivotally connected to a double armed lever, designated generally by the reference numeral 26, which lever is loosely journalled upon rock shaft 25. A portion of the pivot shaft connecting long insulating link 16 and lever 26 is semi-round as shown in the drawing for constituting a switch holding lug 27. As seen in Fig. 4, semi-round lug 27 registers with a notch 28 in a clockwise spring biased latch arm 29 when the switch is closed, the latch holding long link 16 down in opposition to the force stored in the opening spring 18. Whereas, in Fig. 4, semiround lug 27 has been released from registry with notch 28, thereby permitting opening spring 18 to quickly urge insulating link 16 upwardly and open the switch 1.

Axially adjacent double armed lever 26, rock shaft 25 also has affixed to it a single armed lever 30 which executes identical angular movement with eyeleted operating handle 24 when rock shaft 25 is rotated. Lever 30, which is rigid with rock shaft 25, includes two principal features, the first of which is a tripping foot 31 adapted, when swung counterclockwise, to strike and release latch arm 29 from lug 27 and allow quick contraction of spring 18 for opening the switch. The other feature of lever 30 is a driving protuberance 32 which extends integrally from the lever along the axial direction of rock shaft 25 and is clearly evident by inspection of the drawing. Thus, it is seen that clockwise rotation of the manual operating handle 24 will cause protuberance 32 to drive double arm lever 26 clockwise from its switch open position as in Fig. 5 to the position where switch means 1 is latched closed as in Fig. 4. A coil spring 33 is interposed between the levers 30 and 26 so as to normally hold protuberance 32 in contact with the underside of lever 26. However, when the eyeleted manual handle 24 is pulled downwardly, the protuberance 32 moves temporarily away from lever 26. The purpose of spring 33 is to assure that manually operable handle 24 is secured in its uppermost position as in Fig. 4 when the switch is closed so that the operating handle serves as a visual indication of whether the switch is in closed or open position.

A novel magnetic actuator is also provided for causing rock shaft 25 to rotate between two angular positions and to open and close the switch in a manner identical with that which occurs when the rock shaft is rotated by the manual operating handle 24.

Where the switch assembly is applied to capacitor switching duty, it is imperative that the switch means 1 be opened and closed with utmost rapidity in order to avoid arc restrikes and prestrikes between stationary contacts 12 and bridging contact 13. Consequently, the switch means is provided with the relatively powerful switch opening coil spring 18 and powerful switch closing means in the form of a closing solenoid coil 36, capable of developing sufficient power to close the switch and to store energy in the opening spring 18 simultaneously. In general terms, the electromagnetic switch actuator comprises two tandem arranged solenoid coils, one of which, 36, closes the switch 1, and the other, 37, trips the switch open when energized consecutively. The solenoids and other mechanism of the actuator may be installed in housing 4 illustrated in connection with the switch. Closing solenoid 36 is above and coaxially adjacent a smaller tripping solenoid 37 and both of the solenoids are enclosed in a preferably laminated magnetic frame 38. To impress the actuator with compactness and simplicity, a common armature plunger 39 is used for opening and closing the switch and it is arranged for being alternately urged in one direction or the other by the solenoids 36 and 37, respectively. When the air gap 51 between the plunger and the frame is at the bottom as in Fig. 2, plunger 39 is set for opening the switch, whereas, when the air gap is at the top, the plunger is set for closing the switch. There is further provided an auxiliary or limit switch 40 capable of selectively connecting either the opening or closing solenoids in circuit therewith. The purpose of the auxiliary selector switch is to de-energize the proper solenoid coil when the plunger is very near one end or another of its power stroke and to set the circuit for the next operation following receipt by the actuator of another control signal.

Having thus outlined the general features of the invention, attention is now invited to Figs. 1 and 2, particularly, in connection with which the details of one form of electromagnetic actuator will be described.

Referring to Fig. 1, it is seen that rock shaft 25 extends into and terminates within actuator housing 4. In correspondence with manual manipulating handle 24, rock shaft 25 has rigidly affixed to it within housing 4 an offset crank 45 which executes the same angular movement as the rock shaft. When in its Fig. 2 position, crank 45 is rotated to its maximum counterclockwise position which corresponds with closure of switch means 1.

Attached to the free or swinging end of crank 45 there are a pair of parallel links 46 and 47 which pivotally join the crank to the end of an elongated magnetic armature plunger 39. One of the interconnecting links 47 has an L-shaped configuration, see Fig. 2, with the base thereof extending radially from plunger 39 and into the path of an auxiliary switch actuating arm 48 for a purpose to be described shortly hereinafter.

Coils 36 and 37 reciprocate magnetic plunger 39 up and down to effect corresponding closing and opening operations of switch means 1. For the sake of design economy, it is preferable that opening solenoid 37 develop a lesser magnetic pull than solenoid 36, because the former need only exert sufficient force on crank 45 to release latch 29 within switch tank 2, whereupon the switch trips under the influence of the stored energy opening spring 18 which is extended by the larger solenoid coil 36 when switch 1 is closed.

Magnetic frame 38 has upper, intermediate and lower cross members 21, 22 and 23 apertured at 49, 49′ and 49″ for permitting passage of solenoid plunger 39 through the coils. It will be observed that when the switch is in closed position as in Fig. 2, the air gap 51 occurs at the bottom of solenoid plunger 39 within the lower tripping or opening solenoid coil 37. When tripping coil 37 is energized, the inherent tendency for plunger 39 to close the air gap and reduce its reluctance pulls the plunger down and rotates crank arm 45 in a clockwise direction. The converse is true when the plunger 39 starts from its lowermost position and the air gap is on top in solenoid coil 36 so that energization of the latter will pull plunger 39 upwardly and rotate crank 45 in a counterclockwise direction, whereupon the switch means 1 closes.

Figure 3:
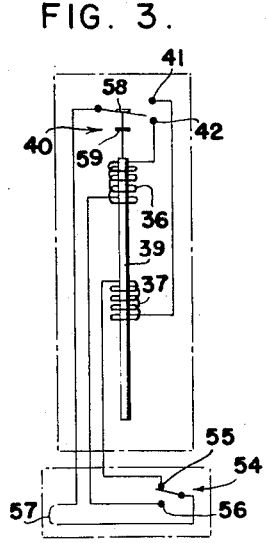
Fig. 3 is a schematic representation of the novel switch actuator including the electrical wiring.

When the plunger 39 has been attracted to its uppermost or lowermost positions, it is preferable to immediately deenergize the solenoid coil which caused the last movement of the plunger so that the solenoids will not continue to consume electric power after the actuator has properly responded to a control signal. As stated earlier, this result is achieved through using an auxiliary selector switch, designated generally by the reference numeral 40. The character of the selector switch 40 is demonstrated in connection with the schematic wiring diagram, Fig. 3. Referring to Fig. 3 it is seen that the selector switch includes a pair of alternate stationary contacts 41 and 42, the first of which is connected in series with the tripping solenoid 37 and the second in series with the closing solenoid 36. If it is assumed that the tripping solenoid 37 was the last to be de-energized after attracting plunger 39 to its lowermost position as shown schematically in Fig. 3, it will then be evident that the auxiliary selector switch 40 was transferred during that operation from connection with terminal 41 to connection with terminal 42 where it now resides and completes a preparatory series circuit through closing solenoid 36. When closing solenoid 36 is in circuit with terminal 42 of the selector switch 40, solenoid 36 is in condition for energization through the agency of a remotely located control switch 54. When remote control switch 54 is rotated from its illustrated position in Fig. 3, where it connects terminal 55 in circuit, to where it completes a circuit, through terminal 56, with a switch closing contact 42, closing solenoid 36 is temporarily energized and solenoid plunger 39 is attracted upwardly. There is a lost motion connection between plunger 39 and selector switch 40 and this connection is symbolized by a pair of spaced bars 58 and 59 disposed on opposite sides of the selector switch actuating arm. Hence, it is evident that when plunger 39 nears its uppermost position that the lower bar 59 will strike the selector switch actuator and transfer the same from contact 42 to the opposite selector contact 41. This opens the closing coil circuit even though terminal 56 of remote control switch 54 remains in circuit with closing coil 36.

Figure 2:
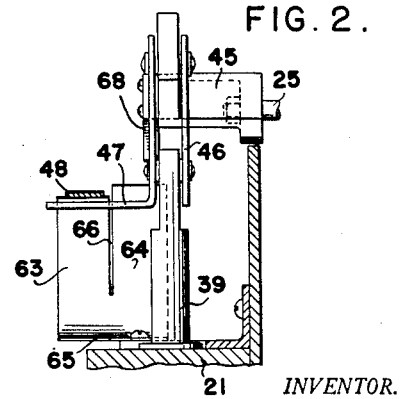
Fig. 2 is a partial section taken on the line 2—2 of Fig. 1.

The result achieved in the last paragraph is realized by very simple and economical means in the actual construction represented by Figs. 1 and 2. The auxiliary transfer switch 40 may take the form of the well known switch sold under the trade-mark Microswitch. It comprises a molded housing which insulatingly supports a thin, flat metal actuating arm 48. Actuating arm 48 rotates through a very limited angle but it is always biased in a counterclockwise direction by a small compression spring 60 interposed between the arm 48 and the molded housing. When plunger 39 is in its uppermost position as shown in Fig. 1, L-shaped link 47 engages and holds actuating arm 48 in its maximum clockwise position. In this event, selector contact 42 of Fig. 3, would be open circuited so that closing solenoid 36 would be de-energized.

In Fig. 1 it will be noted that when switch 1 is closed and crank 45 is up that the extreme free end of actuating arm 48 is restrained by a flexible detent finger 63, causing selector contact 41 to be held in circuit with tripping coil 37. It is then immediately evident that even though L-shaped link 47 would follow plunger 39 downwardly by subsequent energization of tripping coil 37, finger 63 will restrain or hold selector switch actuating arm 48 in its uppermost position temporarily or until the plunger has completed its downward stroke.

Finger 63 constitutes an actuating arm detent and by further reference to Fig. 2 it will be seen that the finger 63 is formed from a thin strip of spring metal having a right angular bend in it to form a base 65 and an upstanding portion out of which the finger is formed by cutting a vertical slot 66 in the upstanding portion and thereby also defining an adjacent detent releasing finger 64 out of the same material. Fingers 63 and 64 are joined together at the end of slot 66 by imperforate metal and by viewing their profile in Fig. 1 it may be seen that detent finger 63 is bent more in excess of a right angle than is detent release finger 64. Obviously, a slight counterclockwise force applied to detent release finger 64 will cause a corresponding movement of detent finger 63 whereupon actuating arm 48 of the selector switch 40 will be released for counterclockwise movement and transfer from contact 41 to the other contact 42.

To accomplish control of selector switch actuating arm 48 automatically, crank arm 45 is provided with a pointed lug 68 secured thereto by screws and adapted to swing in the path of detent release finger 64. Hence, when plunger 39 reaches the lowermost position in its stroke, lug 68 will strike detent release finger 64 and allow actuating arm 48 to be disengaged from the detent finger 63 whereupon the switching transfer mentioned above is accomplished and the tripping solenoid 37 is de-energized. It is evident that lug 68 will strike release finger 64 only when the switch means 1 has opened and crank arm 45 has rotated clockwise to the position shown by the dashed lines in Fig. 1.

When plunger 39 is caused to move from its lowermost switch open position to its uppermost position as shown in Fig. 1, the free end of actuator arm 48 will wipe along the angularly disposed detent finger 63 and ultimately slide over the end of the latter and be engaged thereby. On the upward stroke of plunger 39, actuator arm 48 is driven to the position just mentioned by abutting L-shaped link 47 near the terminal part of the plunger stroke.

The actuator housing 4 also contains near its bottom an insulating terminal block 69 for convenient connection of control wires to the solenoid coils and selector switch. Wires in the actual construction represented by Figs. 1 and 2 are schematically shown in Fig. 3.

Summarizing the remarks made in connection with the first embodiment of the invention, it will be observed that a novel electromagnetic switch actuator has been described which operates upon the rock shaft of the main switch means in the manner of the manual operating handle and that the manual and electromagnetic means are independent of each other. Moreover, it will be realized that when manual handle 24 is operated from one position to another, crank arm 45 of the actuator will execute a corresponding motion and set the selector switch in a new position so that the switch means may be operated subsequently in the proper direction either by the handle or the electromagnetic actuator. It will be further noted that the lost motion connection between the plunger and selector switch and between the detent and detent release means and the crank arm is very simple in form and economical to manufacture.

Figure 6:
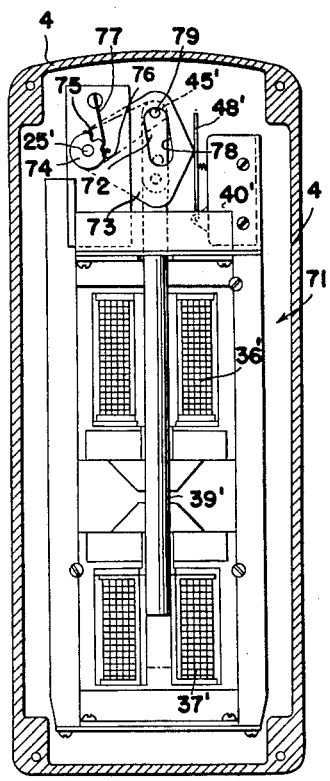
Fig. 6 is an alternative embodiment of a switch actuator incorporating the principles of the invention.

Fig. 6 represents an alternative embodiment of an electromagnetic actuator which is also adaptable to a quick acting switch 1 and may be mounted in a manner similar to the actuator described hereinabove. The second form of actuator embodies all of the general principles of the earlier one and includes the tandem mounted opening and closing coils and lost motion connections between the switch operator and selector switch positioning detent means. In addition, it may be noted that the embodiment of Fig. 6, designated generally by the reference numeral 71 may also be mounted directly on the cover 3 of switch means 1. The switch operating rock shaft designated by the primed reference numeral 25' extends into the housing as before. The self-aligning connection between a crank arm 45' and solenoid plunger 39' is substantially identical to that described earlier except that a pair of similar links 72 now pivotally join the free end of crank arm 45' and the plunger 39'. Crank arm 45' in Fig. 6 is rigidly fastened to rock shaft 25' and axially adjacent the same there is a four-sided cam detent 73 loosely journalled on rock shaft 25'. Integral with cam 73 and also loosely journalled on rock shaft 25' is a disc 74 provided with a pair of circumferentially spaced notches 75 and 76 in its outer periphery. The notches of disc 74 are alternately engageable by the curved end of a flat spring 77 which is fixedly anchored within the housing as shown. Cam 73 is loose on rock shaft 25' but it is restrained in its rotation and definitely positioned by alternate engagement of flat spring 77 with adjacent notches 75 and 76. The selector switch 40' performs the same function and is connected in a similar manner in the electric circuit to that described in connection with Fig. 1 and the schematic representation Fig. 3. Selector switch 40' in Fig. 6, however, has its actuating arm 48' disposed in a vertically upward position. Hence, when cam 73 rotates clockwise the apex of the cam bearing on actuating arm 48, traces a circular path and allows the actuating arm 48' to swing counterclockwise and rest upon one of the flat portions on a side of the apex. This automatically transfers auxiliary selector switch 40' to the other of its alternate positions.

In order to assure that cam 73 will transfer actuator arm 48' to disconnect the solenoid coils 36' or 37' immediately after the operating impulse has been satisfied, cam 73 is provided with a lost motion slot 78 in which a transfer pin 79 extends and moves in conformity with movement of crank arm 45'. As shown in Fig. 6, the elements of the actuator reside in a position corresponding with the oil switch means being closed. Hence, tripping will be the next operation and this is accomplished by energizing the lower tripping solenoid coil 37' and pulling magnetic plunger 39' downwardly. When the plunger moves downwardly, cam 73 is held in its final position by the flat spring 77 engaging and registering in notch 75. However, when the plunger nearly reaches the bottom of its stroke, lost motion transfer pin 79 will strike the bottom of slot 78 and drive cam 73 in a clockwise direction, whereupon the actuator arm 48' comes to rest on the flat portion of cam 73 and disconnects the tripping solenoid 37'. Flat spring 77 will now register with the alternate slot 75 in disc 74 and the cam 73 will be restrained in a definite position. Subsequent energization of closing solenoid 36' through a control switch 54 or similar means will again pull the plunger 39' up and cam 73 will execute an action converse to that just described.

In this embodiment of the invention it will be noted that tripping solenoid 37' is smaller than closing solenoid 36' because the former need only exert sufficient force on rock shaft 25' through plunger 39' to trip latch 29 within the switch means 1. Further, the arrangement of parts in Fig. 6 is such that rock shaft 25' may be rotated by means of the manual operating handle 24 without adverse effect on one operating means by the other.

Operation of the embodiment represented by Fig. 6 is comparably simple to that set forth in connection with the previous embodiment. In the latter case the various solenoids are placed in closed circuit condition by means of a control switch 54 located at a distance quite remote from the actuator. As shown, in Fig. 6, the actuator is in condition for opening the switch means by the manual handle 24 or by energization of tripping coil 37' electrically. Upon this event plunger 39' will be pulled down. At this time lost motion pin 79 will reach the bottom of slot 78 whereupon cam 73 will be urged in a clockwise direction for releasing selector switch actuator arm 48' for execution of a small counterclockwise movement. Upon this event, tripping solenoid 37' will be de-energized and the alternate contact 42 of the auxiliary selector switch 40' will be placed in circuit with closing coil 36'. Subsequent manipulation of control switch 54 will complete the circuit to closing solenoid 36' and converse movement of cam 73 and actuator arm 48' will be effected. In both embodiments of the invention, manual handle 24 will swing with the magnetically driven crank arm 45 so that the handle will always serve to indicate whether switch 1 is opened or closed.

Although two embodiments of the invention have been described in considerable detail, it is to be understood that such description is intended as being illustrative rather than limiting, as the invention is to be variously embodied and is to be interpreted as claimed.

It is claimed:

1. A switch construction comprising switch means operable to closed circuit position, a switch opening spring impressed with stored energy by closing said switch means, latch means normally restraining said opening spring in stored energy condition, a rock shaft operatively connected for closing said switch means when rotated in one direction and for releasing said latch means when rotated in another direction, manual and electromagnetic operating means respectively coupled to the rock shaft for rotation of the latter by one operating means independent of the other, crank means secured to said rock shaft, a magnetic plunger axially reciprocable between switch open and switch closed position and pivotally attached to said crank means, opening and closing solenoids arranged in tandem for jointly receiving said plunger therethrough, a double throw auxiliary switch having a pair of contacts selectively connectable in circuit with and adapted to energize alternate coils in accordance with positions of the crank, said auxiliary switch including a limited movement actuating arm spring biased in one direction, detent means comprising a pair of flexible interconnected fingers, one of said fingers engaging said actuating arm when the latter is moved to one position, and detent release means carried by said crank means and in lost motion connection with said finger when said actuating arm is engaged, whereby said detent release means may become effective to actuate said auxiliary switch when said crank means nears another angular position.

2. The invention according to claim 1 wherein said interconnected fingers are formed from thin, resilient, unitary metal defined by a slot between said fingers, one of said fingers constituting said detent means being angularly advanced toward said actuating arm and releasably engageable with the latter.

3. A switch construction comprising separable contacts, angularly movable crank means operatively coupled with said contacts for moving the same between switch closed and opened positions, a movable magnetic plunger connected to the crank means, opening and closing solenoids jointly receiving said plunger therethrough, a double throw auxiliary switch whose alternate terminals are in circuit with alternate coils for selectively energizing and de-energizing the coils in accordance with positions of the crank means, said auxiliary switch including an actuating arm spring-biased in one direction, detent means comprising a pair of interconnected finger means one of which projects into holding relation with said auxiliary switch arm, means carried by the plunger for moving said auxiliary switch arm into engagement with said one finger means when the crank and plunger are moved in one direction, and means attached to the crank means extending into the path of said other finger means for moving the same and thereby releasing said auxiliary switch arm when the crank and plunger are moved in another direction.

References Cited in the file of this patent

UNITED STATES PATENTS

| | | |
|---|---|---|
| 2,515,530 | Schindler | July 18, 1950 |
| 2,701,828 | Edwards et al. | Feb. 8, 1955 |
| 2,705,295 | Edwards | Mar. 29, 1955 |
| 2,748,221 | Edwards et al. | May 29, 1956 |